United States Patent
Wang et al.

(10) Patent No.: US 10,539,837 B2
(45) Date of Patent: Jan. 21, 2020

(54) DISPLAY PANEL COMPRISING FIRST AND SECOND POST SPACERS AND A SPACER SUPPORTING BLOCK PROTRUDING FROM A SECOND SUBSTRATE AND DISPLAY DEVICE HAVING THE SAME

(71) Applicant: BOE TECHNOLOGY GROUP CO., LTD., Beijing (CN)

(72) Inventors: Xinxing Wang, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/743,411

(22) PCT Filed: Jul. 6, 2017

(86) PCT No.: PCT/CN2017/091989
§ 371 (c)(1),
(2) Date: Jan. 10, 2018

(87) PCT Pub. No.: WO2018/032901
PCT Pub. Date: Feb. 22, 2018

(65) Prior Publication Data
US 2019/0033644 A1    Jan. 31, 2019

(30) Foreign Application Priority Data
Aug. 19, 2016 (CN) .......................... 2016 1 0696885

(51) Int. Cl.
*G02F 1/1339* (2006.01)
*G02F 1/1335* (2006.01)
(Continued)

(52) U.S. Cl.
CPC .... *G02F 1/13394* (2013.01); *G02F 1/133512* (2013.01); *G02F 1/136286* (2013.01);
(Continued)

(58) Field of Classification Search
CPC ............................................. G02F 2001/13396
See application file for complete search history.

(56) References Cited

U.S. PATENT DOCUMENTS 6,088,071 A * 7/2000 Yamamoto ........ G02F 1/136213
349/38
2006/0238693 A1* 10/2006 Yoon ................. G02F 1/133753
349/155
(Continued)

FOREIGN PATENT DOCUMENTS

| CN | 1854867 A | 11/2006 |
| CN | 1991488 A | 7/2007 |

(Continued)

OTHER PUBLICATIONS

First Office Action, including Search Report, for Chinese Patent Application No. 201610696885.2, dated Oct. 8, 2018, 10 pages.
(Continued)

*Primary Examiner* — Paul C Lee
(74) *Attorney, Agent, or Firm* — Westman, Champlin & Koehler, P.A.

(57) ABSTRACT

The present disclosure discloses a display panel and a display device. The display panel includes a cell defined by a first substrate and a second substrate oppositely arranged with respect to the first substrate, and a plurality of post spacers on the first substrate. The second substrate includes a plurality of sub-pixels, the post spacers include a first post spacer and a second post spacer at one side of the first post spacer away from the sub-pixels. A spacer supporting block protrudes from the second substrate, and enables an end portion of the first post spacer away from the first substrate not to contact with the second substrate when the display panel is subjected to an external force. The end portion of the first post spacer away from the first substrate and the spacer
(Continued)

supporting block partially overlap with each other in a direction perpendicular to the second substrate.

15 Claims, 3 Drawing Sheets

(51) Int. Cl.
G02F 1/1362 (2006.01)
G02F 1/1368 (2006.01)

(52) U.S. Cl.
CPC .. G02F 1/1368 (2013.01); G02F 2001/13396 (2013.01); G02F 2001/13398 (2013.01); G02F 2201/40 (2013.01)

(56) References Cited

U.S. PATENT DOCUMENTS

| 2008/0198317 | A1* | 8/2008 | Tseng | G02F 1/13394 349/138 |
| 2009/0231522 | A1* | 9/2009 | Kim | G02F 1/13394 349/106 |
| 2015/0002794 | A1 | 1/2015 | Liu et al. | |
| 2015/0035873 | A1* | 2/2015 | Shima | G02B 27/2214 345/690 |
| 2015/0092132 | A1* | 4/2015 | Kang | H01L 27/1214 349/43 |
| 2018/0252958 | A1 | 9/2018 | Jiang et al. | |

FOREIGN PATENT DOCUMENTS

| CN | 102213857 A | 10/2011 |
| CN | 103018969 A | 4/2013 |
| CN | 103472632 A | 12/2013 |
| CN | 103885250 A | 6/2014 |
| CN | 103984153 A | 8/2014 |
| CN | 105807507 A | 7/2016 |
| CN | 106094359 A | 11/2016 |

OTHER PUBLICATIONS

International Search Report and Written Opinion for International Application No. PCT/CN2017/091989, dated Sep. 27, 2017, 10 pages.
English translation of International Search Report and Written Opinion for International Application No. PCT/CN2017/091989, dated Sep. 27, 2017, 8 pages.

* cited by examiner

DISPLAY PANEL COMPRISING FIRST AND SECOND POST SPACERS AND A SPACER SUPPORTING BLOCK PROTRUDING FROM A SECOND SUBSTRATE AND DISPLAY DEVICE HAVING THE SAME

CROSS-REFERENCE TO RELATED APPLICATION

This application is the U.S. national phase of PCT Application No. PCT/CN2017/091989, filed on Jul. 6, 2017, which is based on and claims the priority of the Chinese patent application No. 201610696885.2 filed on Aug. 19, 2016, which is incorporated herein by reference in its entirety.

TECHNICAL FIELD

The present disclosure relates to the field of displaying technologies, and in particular to a display panel and a display device.

BACKGROUND

Thin film transistor liquid crystal display (TFT-LCD) device occupies a dominant position in the current flat panel display device market, due to its advantages such as mall volume, low power consumption, no radiation and relatively low manufacturing cost.

The thin film transistor liquid crystal display device includes a display panel which includes a cell defined by an array substrate and a color substrate oppositely arranged with respect to the array substrate, and a liquid crystal layer filled between the array substrate and the color substrate. The array substrate includes data lines, gate lines and a plurality of pixel units defined by the data lines and the gate lines. A thickness of the liquid crystal layer, i.e., cell thickness, is controlled by post spacers (PS) formed between the array substrate and the color substrate. The post spacers are made of elastic polymers, and may be formed on the array substrate or the color substrate. The post spacers are generally formed on positions of the color substrate corresponding to black matrices, and are divided into main post spacers (main PS) and sub-post spacers (sub PS).

When the display device is subjected to a large external force (for example, when the panel is tested by external forces), end portions of the main post spacers may be offset, enter into a pixel region and scratch a polyimide (PI) alignment film in the pixel region, resulting in poor display such as light spots.

SUMMARY

An object of the present disclosure is to provide a display device and a display device, which can prevent post spacers from scratching an alignment film in a pixel region without widening black matrices, thereby preventing a decrease in an aperture ratio caused by widening the black matrices, and then improving transmission rate in addition to preventing occurrence of strip mura.

Technical solutions provided in the present disclosure are as follow.

A display panel includes a cell defined by a first substrate and a second substrate oppositely arranged with respect to the first substrate, and a plurality of post spacers on the first substrate. The second substrate includes a plurality of sub-pixels, the post spacers are in regions among the sub-pixels. The post spacers include a first post spacer and a second post spacer which are in a region between two adjacent sub-pixels. The first post spacer includes a first side and an opposite second side; the first side is adjacent to one of the two adjacent sub-pixels, and the second post spacer is at the second side. A spacer supporting block protrudes from the second substrate, and enables an end portion of the first post spacer away from the first substrate not to contact with the second substrate when the display panel is subjected to an external force. The end portion of the first post spacer away from the first substrate and the spacer supporting block partially overlap with each other in a direction perpendicular to the second substrate.

Further, the first substrate is a color substrate, and the second substrate is an array substrate.

Further, the array substrate includes gate lines, data lines crossing the date lines to define the plurality of sub-pixels, and a pixel electrode in each sub-pixel. In an extension direction of the data lines, there are at least two post spacers between two adjacent sub-pixels, and at least one of the at least two post spacers is the first post spacer and is partially overlapped with the pixel electrode in a direction perpendicular to the second substrate. At least another one of the at least two post spacers is the second post spacer, and is not overlapped with the pixel electrode in the direction perpendicular to the second substrate. The spacer supporting block is between the first post spacer and the second post spacer.

Further, an orthographic projection of the first post spacer to the first substrate is a long strip with a long side of which an extension direction is parallel to the extension direction of the data lines.

Further, an orthographic projection of the second post spacer to the first substrate is a long strip with a long side of which an extension direction is parallel to the extension direction of the data lines.

Further, there are two spacer-end-stoppers disposed at one side of the second post spacer away from the first post spacer and another side of the second post spacer close to the first post spacer, respectively. An end portion of the second post spacer away from the color substrate extends to a position between the two spacer-end-stoppers; one of the two spacer-end-stoppers, which is closer to the first post spacer, forms the spacer supporting block.

Further, the spacer supporting block has a height which is greater than or equal to 0.6 um.

Further, the spacer supporting block is a metal protrusion line formed on the second substrate.

Further, an area of an orthographic projection of an end portion of each post spacer where each post spacer is connected with the first substrate, to the first substrate, is greater than an area of an orthographic projection of another end portion of each post spacer which is away from the first substrate, to the first substrate.

Further, the spacer supporting block is partially embedded in an end portion of the first post spacer which is away from the first substrate.

Further, the first post spacer includes a groove defined in end portion of the first post spacer which is away from the first substrate; and a top portion of the spacer supporting block is embedded into the groove.

Further, a black matric covering region is formed at the first substrate. One part of an orthographic projection of the first post spacer to the first substrate is in the black matric covering region, and the other part of the orthographic projection of the first post spacer to the first substrate is outside of the black matric covering region.

Further, an entire orthographic projection of the second post spacer to the first substrate is in the black matric covering region.

Further, the first substrate is a color substrate.

A display device includes the above display panel.

The present disclosure has the following beneficial effects.

According to the display panel provided in the present disclosure, when an external force is applied to the post spacer on the array substrate which is closest to the sub-pixel, the post spacer abuts against the spacer supporting block and then does not contact with the second substrate, thereby preventing the post spacer from scratching the PI film on the second substrate, and thus avoiding light leakage. Further, black matrices only need to cover a non-display region bounded by the spacer supporting block, and it is not needed to additionally widen the black matrices towards the sub-pixel region, thereby greatly increasing the aperture ratio, improving the transmission rate in addition to avoiding strip mura, and having excellent comprehensive performance.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 2:
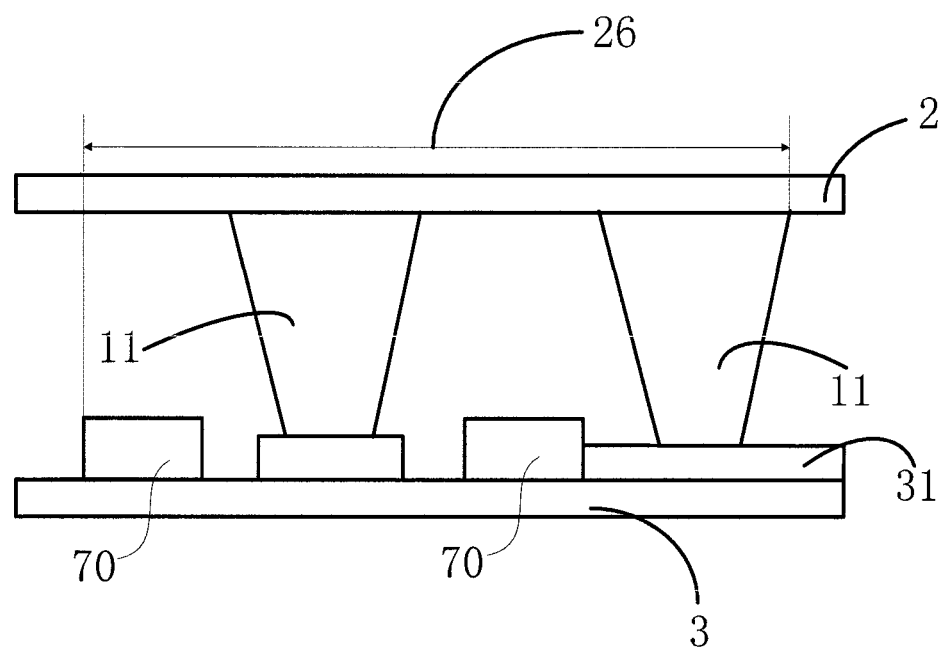
FIG. 2 is a partial cross-sectional view of a display panel in the related art.
Figure 3:
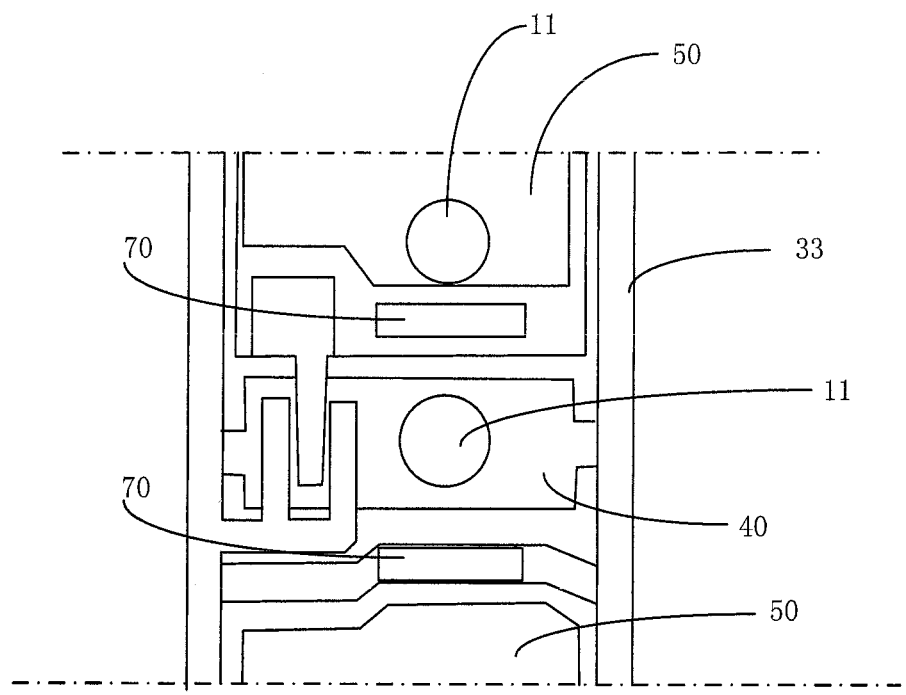
FIG. 3 is a partial top view of the display panel in the related art.

In the related art, as shown in FIG. 2 and FIG. 3, a display panel includes a color substrate 2, an array substrate 3 and post spacers 11 disposed between the color substrate 2 and the array substrate 3. The array substrate 2 includes gate lines 40 and data lines 33. The post spacers include a main post spacer (PS) and a sub-post spacer (sub PS). A height of the main post spacer is greater than a height of the sub-post spacer. Under action of an external force, for example, when the panel is tested by external forces, if an end portion of the main post spacer at a position which is closest to the sub-pixel is offset by 40 um, the end portion of the main post spacer enters into a pixel region and scratches a polyimide (PI) alignment film 31, resulting in light spots (blue dots are usually generated at position of blue sub-pixels). However, a small light spot on the micro may cause a large bright spot.

Figure 1:
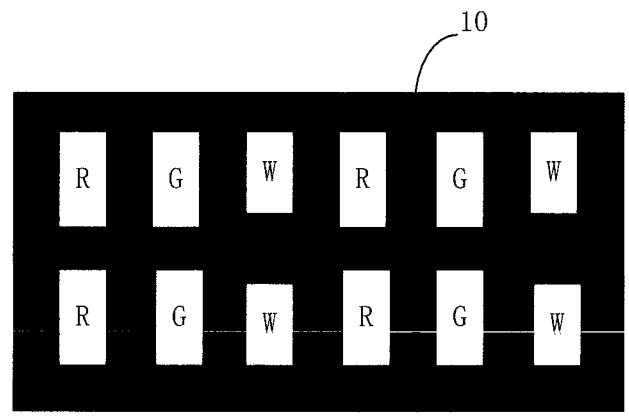
FIG. 1 is a schematic view of widened black matrices to prevent a polyimide (PI) alignment film from being scratched by post spacers in the related art.

As shown in FIG. 1, in order to avoid the above problem, in the related art, black matrices 10 at positions of the main post spacers are usually widened in a direction of the data lines, but this will result in a decrease in an aperture ratio, and a decline in the transmission rate and risk of occurrence of strip mura.

In view of the above problem, one embodiment of the present disclosure provides a display panel which can prevent the post spacers from scratching the polyimide alignment film in the pixel region without widening the black matrices, thereby preventing a decrease in an aperture ratio caused by widening the black matrices, and then improving transmission rate in addition to preventing occurrence of strip mura.

Figure 4:
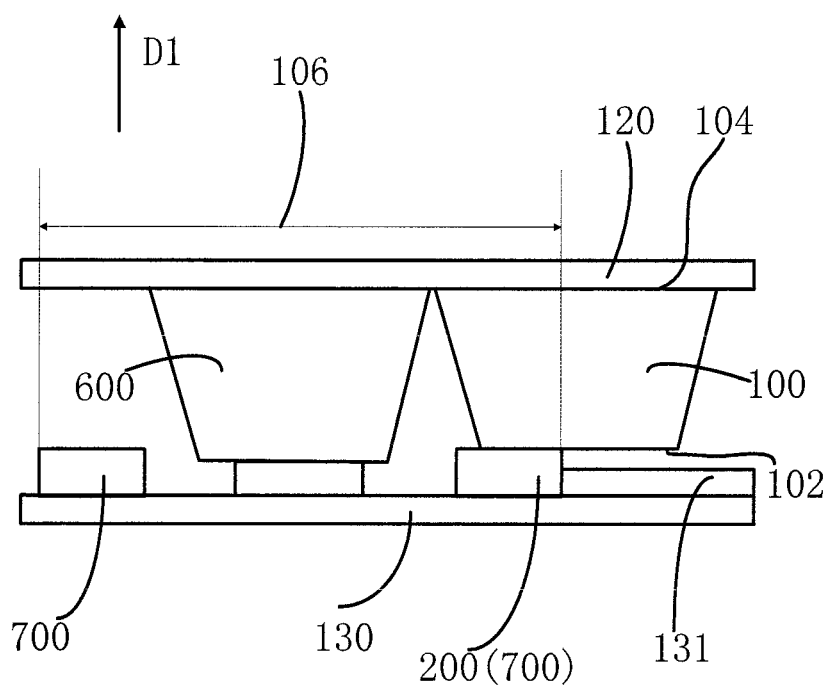
FIG. 4 is a partial cross-sectional view of a display panel according to an embodiment of the present disclosure.
Figure 5:
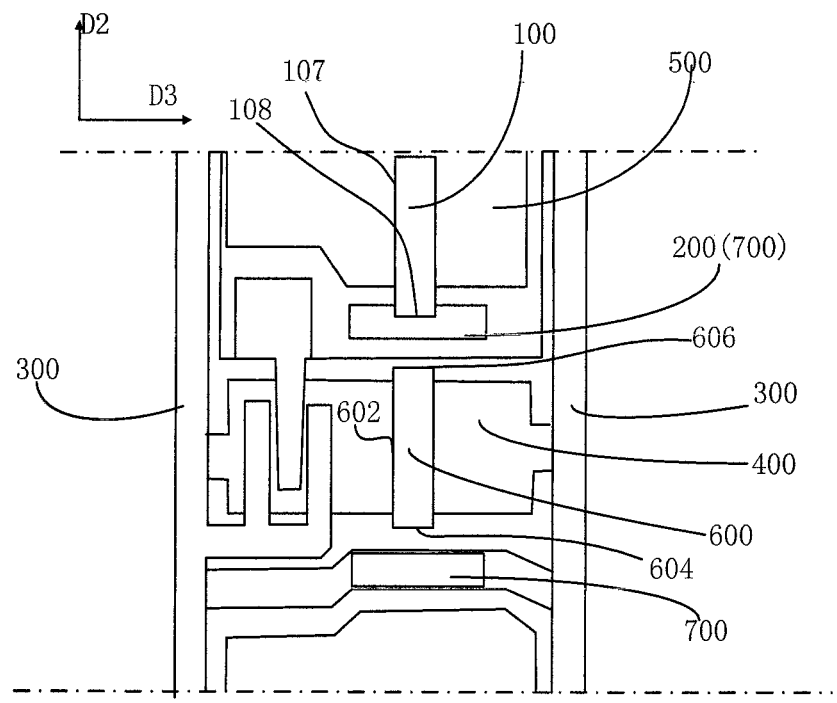
FIG. 5 is a partial top view of the display panel according to an embodiment of the present disclosure.

As shown in FIG. 4 and FIG. 5, a display panel provided in one embodiment of the present disclosure includes a cell defined by a first substrate 120 and a second substrate 130 which are opposite arranged to each other, and a plurality of post spacers disposed on the first substrate 120. The second substrate 130 includes a plurality of sub-pixels. The post spacers are in regions among the sub-pixels. The post spacers include a first post spacer 100 and a second post spacer 600 which are in a region between two adjacent sub-pixels. The first post spacer 100 includes a first side and an opposite second side. The first side is adjacent to one of the two adjacent sub-pixels, and the second post spacer is at the second side. A spacer supporting block 200 protrudes from the second substrate 130, and enables an end portion of the first post spacer 100 away from the first substrate 120, i.e., a first portion 102, not to contact with the second substrate 130 when the display panel is subjected to an external force. The end portion of the first post spacer 100 away from the first substrate 120, i.e., the first portion 102, and the spacer supporting block 200 partially overlap with each other in a direction perpendicular to the second substrate 130 (for example, a first direction indicated by D1 shown in FIG. 4).

In one embodiment, "partially overlap" means that one part of the first portion 102 of the first post spacer 100 is in direct contact with the spacer supporting block 200 in the first direction D1 (as shown in FIG. 4) perpendicular to the second substrate 130, or, there is an overlapping region between a projection of the first portion 102 of the first post spacer 100 to the second substrate 130 and a projection of the spacer supporting block 200 to the second substrate 130. In one embodiment, when no external force is applied to the first substrate 120 and the first post spacer 100, the first portion 102 of the first post spacer 100 may be in contact with or be separated from the spacer supporting block 200.

According to the display panel provided in the present disclosure, when an external force is applied to the first post spacer 100 on the array substrate 120 which is closest to the sub-pixel, the first post spacer 100 abuts against the spacer supporting block 200 and then does not contact with the second substrate 130, thereby preventing the end portion of the first post spacer 100 from being offset and from scratching the PI film 131 on the second substrate 130, and thus avoiding light spots. Further, black matrices only need to cover a non-display region (which is referred as a black matric covering region 106) bounded by the spacer supporting block 200, and it is not needed to additionally widen the black matrices towards the sub-pixel region, thereby greatly increasing the aperture ratio, improving the transmission rate in addition to avoiding strip mura, and having excellent comprehensive performance.

In one embodiment of the present disclosure, optionally, the first substrate 120 may be a color substrate, and the second substrate 130 may be an array substrate. In the above technical solution, the post spacers are disposed on the color substrate, and the spacer supporting block 200 is disposed on the array substrate. It should be noted, in actual applications, the post spacers may also be disposed on the array substrate, and the spacer supporting block 200 may be disposed on the color substrate.

It should be noted, among the post spacers on the first substrate 120, the first post spacer 100 is a main post spacer which is closest to the sub-pixel. In actual applications, the first post spacer 100 may also be a sub-post spacer corresponding to different types of products.

As shown in FIG. 3, in the related art, between two sub-pixels, there are two post spacers 11 sequentially arranged along an extension direction of the data line 33. One of the two post spacers 11 is closer to one of the two sub-pixels, and is partially overlapped with a pixel electrode 50 in the one of the two sub-pixels; and the other of the two post spacers 11 is located at a position between the two sub-pixels, and is not contact with the pixel electrode 50.

In the present disclosure, the post spacer which is closest to the sub-pixel is designed to have a structure that can be overlapped with the spacer supporting block 200. Specifically, as shown in FIG. 4 and FIG. 5, in one embodiment of the present disclosure, the array substrate includes gate lines 400 and data lines 300. The gate lines 400 are arranged vertically, the date lines 300 are arranged horizontally, and the gate lines 400 cross the date lines 300 to define a plurality of sub-pixels. One pixel electrode 500 is disposed in each sub-pixel.

In an extension direction of the data lines 300, there are at least two post spacers between two adjacent sub-pixels. At least one of the at least two post spacers is the first post spacer 100, is closer to one of two adjacent sub-pixels, and is partially overlapped with the pixel electrode 500 in a direction perpendicular to the second substrate 130.

At least another one of the at least two post spacers is the second post spacer 600, is not overlapped with the pixel electrode 500 in the direction perpendicular to the second substrate 130, and is located at a position between the two sub-pixels.

The spacer supporting block 200 is arranged between the first post spacer 100 and the second post spacer 600.

It should be noted that, an engagement between the spacer supporting block 200 and the first post spacer 100 which is closest to the sub-pixel enables the first post spacer 100 not to contact with the second substrate 130, thereby avoiding scratching the PI film 131 on the second substrate 130. Except for the above embodiments, in other embodiments, distribution and structures of the post spacers may also be other forms corresponding to different types of products.

In addition, it should be noted, the spacer supporting block 200 is disposed between the first post spacer 100 and the second post spacer 600, the black matrices only need to cover the non-display region (which is referred as the black matric covering region 106) bounded by the spacer supporting block 200, and it is not needed to additionally widen the black matrices towards the sub-pixel region, thereby greatly increasing the aperture ratio. In actual applications, corresponding to different types of products, the spacer supporting block 200 may also be disposed at other position, as long as the spacer supporting block 200 is located around the first post spacer 100.

In addition, in one embodiment of the present disclosure, optionally, as shown in FIG. 4 and FIG. 5, an orthographic projection of the first post spacer 100 to the first substrate 120 is a long strip with a long side 107 of which an extension direction is parallel to the extension direction of the data line 300.

As compared with the cylindrical post spacer shown in FIG. 3, in the above technical solution of one embodiment as shown in FIG. 5, the orthographic projection of the first post spacer 100 to the first substrate 120 is the long strip, the extension direction (indicted by D2 shown in FIG. 5) of the long side 107 of the long strip is parallel to the extension direction of the data line 300, and an extension direction (indicted by D3 shown in FIG. 5) of a short side 108 of the long strip is parallel to an extension direction of the gate line 400. Further, a length of the short side 108 is smaller than a size of a diameter of the cylindrical post spacer (shown in FIG. 3) in the related art, this is because a contact area between one spacer and one substrate is usually fixed in the field of liquid crystal display panel technology and is a preset contact area, then when the length of the first post spacer 100 in the extension direction of the data line 300 is increased as compared with the cylindrical post spacer in the related art, a length of the first post spacer 100 in the short side is then reduced so that an end area of the first post spacer 100 in the display panel of one embodiment of the present disclosure is substantially equal to an end area of the cylindrical post spacer in the related art.

It should be noted that, in actual applications, the shape of the first post spacer 100 is not limited, and may be of other shapes, as long as the first post spacer 100 is capable of overlapping the spacer supporting block 200 in the extension direction of the date line 300.

In addition, in one embodiment of the present disclosure as shown in FIG. 5, an orthographic projection of the second post spacer 600 to the first substrate 120 is a long strip with a long side 602 of which an extension direction is parallel to the extension direction of the data line 300. In this way, the second post spacer 600 between the two sub-pixels may be designed to have the same structure as the first post spacer 100, thereby simplifying the process.

In addition, in one embodiment of the present disclosure as shown in FIG. 4 and FIG. 5, there are two spacer-end-stoppers 700 disposed at one side such as a first side 604 of the second post spacer 600 away from the first post spacer 100 and another side such as a second side 606 of the second post spacer 600 close to the first post spacer 100, respectively. An end portion of the second post spacer 600 away from the color substrate extends to a position between the two spacer-end-stoppers 700. One of the two spacer-end-stoppers 700, which is closer to the first post spacer 100, forms the spacer supporting block 200.

As shown in FIG. 2 and FIG. 3, in the related art, along the extension direction of the data line 33, spacer-end-stoppers 70 are disposed between two subpixels for limiting positions of end portions of the post spacers. In an optional embodiment of the present disclosure, one of the spacer-end-stoppers 70 is directly taken as the spacer supporting block 200 (as shown in FIG. 4). It should be noted, in actual applications, the spacer supporting block 200 may be disposed separately according to product structures.

In one embodiment, when one of the spacer-end-stoppers 70 shown in FIG. 2 is directly taken as the spacer supporting block 200 as shown in FIG. 4, a distance between the two spacer-end-stoppers 70 shown in FIG. 2 is equal to a distance between the two spacer-end-stoppers 700 (one of which is taken as the spacer supporting block 200) as shown in FIG. 4, and thus, an area of the black matric covering region 106 shown in FIG. 4 is smaller than an area of a black matric covering region 26 shown in FIG. 2. In other words, an aperture ratio of the display panel shown in FIG. 4 is greater than an aperture ratio of the display panel shown in FIG. 2. Therefore, the display panel of one embodiment of the present disclosure can greatly increase the aperture ratio on the premise of ensuring that no light leakage occurs, thereby improving the transmission rate in addition to avoiding strip mura and having excellent comprehensive performance. In addition, in one embodiment of the present disclosure, optionally, the spacer supporting block 200 has a height which is greater than or equal to 0.6 um.

According to the above technical solution, when an external force is applied to the display panel, the spacer supporting block 200 is able to continue supporting one part of the first post spacer 100, which overlaps the spacer supporting block 200. Since the post spacer is usually made of elastic material, one part of the first post spacer 100, which is not supported by the spacer supporting block 200, has a springback degree which is smaller than or equal to an M-S segment different (≤0.55 um). Thus, when the height of the spacer supporting block 200 is greater than or equal to 0.6 um, it can ensure that the first post spacer 100 cannot be contact with the PI film 131 on the second substrate 130 and cannot scratch the PI film to avoid light leakage.

In addition, in one embodiment of the present disclosure, the spacer supporting block 200 may be a metal protrusion line formed on the second substrate 130. In other words, the spacer supporting block 200 is defined by the metal protrusion line formed on the second substrate 130. It should be noted that, the spacer supporting block 200 may be formed in other forms.

In addition, in one embodiment of the present disclosure as shown in FIG. 4, an area of an orthographic projection of an end portion such as a second end portion 104 of each post spacer where each post spacer is connected with the first substrate, to the first substrate 120, is greater than an area of an orthographic projection of another end portion such as a first end portion 102 of each post spacer which is away from the first substrate 120, to the first substrate 120.

In addition, it should be noted, in the related art, generally, post spacers at positions where blue subpixels are located tend to scratch the PI film, thus, in one embodiment of the present disclosure, the first post spacer 100 which is closest to the blue subpixels is necessary to be partially overlapped with the spacer supporting block 200.

Figure 6:
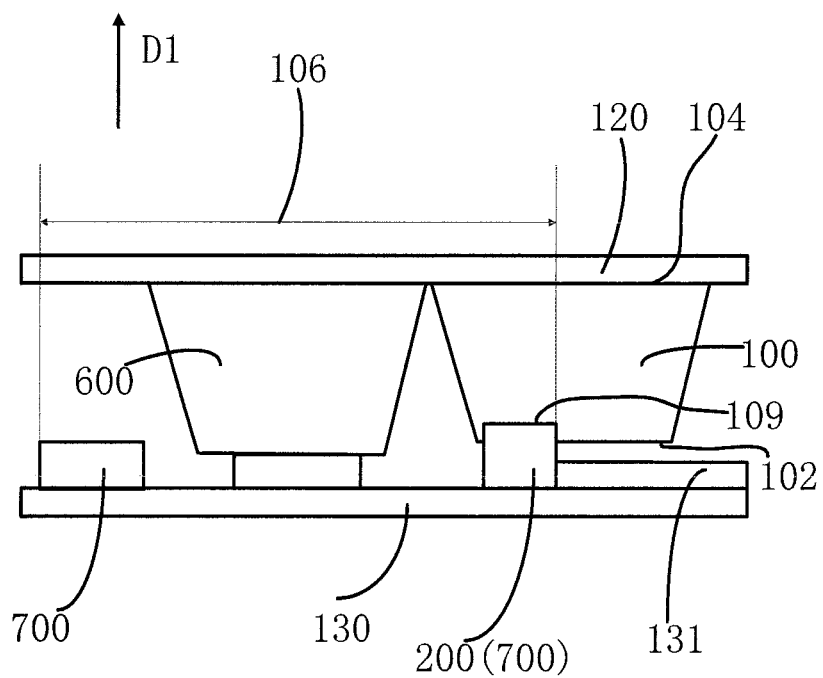
FIG. 6 is a partial cross-sectional view of a display panel according to an embodiment of the present disclosure.

FIG. 6 is a partial cross-sectional view of a display panel according to an embodiment of the present disclosure. The display panel shown in FIG. 6 is similar to the display device shown in FIG. 4, except that the spacer supporting block 200 in the display panel shown in FIG. 6 is partially embedded in the first post spacer 100. Specifically, the first post spacer 100 includes a groove 109 defined in the first portion 102, and a top portion of the spacer supporting block 200 is embedded into the groove 109. Since the top portion of the spacer supporting block 200 is embedded into the groove 109, it can further prevent the end portion of the first post spacer 100 from being offset and from scratching the PI film 131 on the second substrate 130, thereby avoiding light leakage. Further, as shown in FIG. 4 and FIG. 6, one part of an orthographic projection of the first post spacer 100 to the first substrate 120 is in the black matric covering region 106, the other part of the orthographic projection of the first post spacer 100 to the first substrate 120 is outside of the black matric covering region 106, and an entire orthographic projection of the second post spacer 600 to the first substrate 120 is in the black matric covering region 106. Thus, black matrices only need to cover the non-display region bounded by the spacer supporting block 200, and it is not needed to additionally widen the black matrices towards the sub-pixel region, thereby greatly increasing the aperture ratio, improving the transmission rate in addition to avoiding strip mura, and having excellent comprehensive performance. In addition, in order to reduce an area of the black matric covering region 106, as shown in FIG. 6, a position of the groove 109 in the first end portion 102 is as close as possible to the second post spacer 600.

In addition, one embodiment of the present disclosure further provides a display device which includes the above display panel.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A display panel comprising:
    a cell defined by a first substrate and a second substrate oppositely arranged with respect to the first substrate;
    a plurality of post spacers on the first substrate;
    wherein the second substrate includes gate lines, data lines crossing the gate lines to define a plurality of sub-pixels each including a thin film transistor, the post spacers are in regions among the sub-pixels; the post spacers includes a first post spacer and a second post spacer which are in a region between two adjacent sub-pixels; the first post spacer includes a first side and an opposite second side; the first side is adjacent to one of the two adjacent sub-pixels, and the second post spacer is at the second side;
    wherein a spacer supporting block protrudes from the second substrate, and enables an end portion of the first post spacer away from the first substrate not to contact with the second substrate when the display panel is subjected to an external force; and an orthographic projection of the end portion of the first post spacer away from the first substrate to the second substrate and an orthographic projection the spacer supporting block to the second substrate partially overlap with each other,
    wherein an orthographic projection of the first post spacer to the second substrate and an orthographic projection of the spacer supporting block to the second substrate do not overlap with an orthographic projection of gate lines, data lines and the thin film transistor to the second substrate.

2. The display panel of claim 1, wherein the first substrate is a color substrate, and the second substrate is an array substrate.

3. The display panel of claim 2, wherein the array substrate includes a pixel electrode in each of the plurality of sub-pixel;
    wherein in an extension direction of the data lines, there are at least two post spacers between two adjacent sub-pixels, and at least one of the at least two post spacers is the first post spacer and an orthographic projection of the first post spacer to the array substrate is partially overlapped with an orthographic projection of the pixel electrode to the array substrate;
    wherein at least another one of the at least two post spacers is the second post spacer, and an orthographic projection of the second post spacer to the array substrate is not overlapped with the orthographic projection of the pixel electrode to the array substrate; and
    wherein the spacer supporting block is between the first post spacer and the second post spacer.

4. The display panel of claim 3, wherein an orthographic projection of the first post spacer to the first substrate is a long strip with a long side of which an extension direction is parallel to the extension direction of the data lines.

5. The display panel of claim 3, wherein an orthographic projection of the second post spacer to the first substrate is a long strip with a long side of which an extension direction is parallel to the extension direction of the data lines.

6. The display panel of claim 4, wherein there are two spacer-end-stoppers disposed at one side of the second post spacer away from the first post spacer and another side of the second post spacer close to the first post spacer, respectively;
> an end portion of the second post spacer away from the color substrate extends to a position between the two spacer-end-stoppers; one of the two spacer-end-stoppers, which is closer to the first post spacer, forms the spacer supporting block.

7. The display panel of claim 1, wherein the spacer supporting block has a height which is greater than or equal to 0.6 um.

8. The display panel of claim 1, wherein the spacer supporting block is a metal protrusion line formed on the second substrate.

9. The display panel of claim 1, wherein an area of an orthographic projection of an end portion of each post spacer where each post spacer is connected with the first substrate, to the first substrate, is greater than an area of an orthographic projection of another end portion of each post spacer which is away from the first substrate, to the first substrate.

10. The display panel of claim 1, wherein the spacer supporting block is partially embedded in an end portion of the first post spacer which is away from the first substrate.

11. The display panel of claim 10, wherein the first post spacer includes a groove defined in end portion of the first post spacer which is away from the first substrate; and a top portion of the spacer supporting block is embedded into the groove.

12. The display panel of claim 1, wherein a black matric covering region is formed at the first substrate;
> wherein one part of an orthographic projection of the first post spacer to the first substrate is in the black matric covering region, and the other part of the orthographic projection of the first post spacer to the first substrate is outside of the black matric covering region.

13. The display panel of claim 12, wherein an entire orthographic projection of the second post spacer to the first substrate is in the black matric covering region.

14. The display panel of claim 12, wherein the first substrate is a color substrate.

15. A display device comprising the display panel of claim 1.

* * * * *